US012694282B2

(12) United States Patent
Huang et al.

(10) Patent No.: US 12,694,282 B2
(45) Date of Patent: Jul. 28, 2026

(54) METHOD AND APPARATUS FOR GENERATING NEURAL NETWORK MODEL, AND COMPUTER-READABLE STORAGE MEDIUM

(71) Applicant: Tencent Technology (Shenzhen) Company Limited, Shenzhen (CN)

(72) Inventors: Ying Huang, Shenzhen (CN); Dajun Zhou, Shenzhen (CN); Xudong Li, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 1174 days.

(21) Appl. No.: 17/304,226

(22) Filed: Jun. 16, 2021

(65) Prior Publication Data

US 2021/0365782 A1    Nov. 25, 2021

Related U.S. Application Data

(63) Continuation of application No. PCT/CN2020/097749, filed on Jun. 23, 2020.

(30) Foreign Application Priority Data

Jun. 27, 2019    (CN) .......................... 201910565729.6

(51) Int. Cl.
| | |
|---|---|
| *G06N 3/045* | (2023.01) |
| *A63F 13/45* | (2014.01) |
| *G06N 3/08* | (2023.01) |

(52) U.S. Cl.
CPC .............. *G06N 3/08* (2013.01); *A63F 13/45* (2014.09); *G06N 3/045* (2023.01)

(58) Field of Classification Search
CPC ........... G06N 3/08; G06N 3/045; A63F 13/45
See application file for complete search history.

(56) References Cited

U.S. PATENT DOCUMENTS

| | | | | |
|---|---|---|---|---|
| 9,330,362 B2 * | 5/2016 | Bilenko | ................. | G06N 20/00 |
| 9,679,258 B2 * | 6/2017 | Mnih | ...................... | A63F 13/67 |

(Continued)

FOREIGN PATENT DOCUMENTS

| | | |
|---|---|---|
| CN | 105844627 | 8/2016 |
| CN | 108446534 | 8/2018 |

(Continued)

OTHER PUBLICATIONS

Japanese Office Action issued Oct. 3, 2022 in Application No. 2021-544390, with English Translation pp. 1-8.

(Continued)

*Primary Examiner* — Beau D Spratt
(74) *Attorney, Agent, or Firm* — ArentFox Schiff LLP

(57)    ABSTRACT

In a method causing an electronic device to generate a neural network model that controls a game element, a hyperparameter value in a first neural network model is determined from a hyperparameter value set. A structural layer of the first neural network model includes the hyperparameter value, and an output layer, an input layer, and the structural layer are connected in a target connection. A first model accuracy of a second neural network model is obtained by training the first neural network model, and hyperparameter values of some hyperparameters in the first neural network model are updated to corresponding target hyperparameter values if the first model accuracy is lower than a target accuracy.

14 Claims, 11 Drawing Sheets

(56) References Cited

U.S. PATENT DOCUMENTS

| | | | |
|---|---|---|---|
| 11,058,948 B1 * | 7/2021 | Hardiman | A63F 13/798 |
| 2016/0224903 A1 | 8/2016 | Talathi et al. | |
| 2018/0240041 A1 * | 8/2018 | Koch | G06N 20/10 |
| 2019/0087952 A1 * | 3/2019 | Milbert | G06V 30/424 |
| 2019/0095819 A1 | 3/2019 | Varadarajan et al. | |
| 2019/0130272 A1 | 5/2019 | Yosinski et al. | |
| 2019/0156229 A1 | 5/2019 | Tee et al. | |
| 2019/0197402 A1 * | 6/2019 | Kovács | A63F 13/60 |
| 2019/0291007 A1 * | 9/2019 | Condrey | A63F 13/795 |
| 2019/0341052 A1 * | 11/2019 | Allibhai | G06N 3/045 |
| 2019/0354759 A1 * | 11/2019 | Somers | G06N 5/046 |
| 2019/0384790 A1 * | 12/2019 | Bequet | G06N 3/084 |
| 2020/0226496 A1 * | 7/2020 | Basu | G06N 5/01 |
| 2020/0272913 A1 * | 8/2020 | Yu | G06N 3/08 |
| 2020/0287814 A1 * | 9/2020 | Zhao | G06N 3/084 |
| 2020/0384362 A1 * | 12/2020 | Shah | A63F 13/424 |
| 2020/0403944 A1 * | 12/2020 | Joshi | G06F 16/2365 |
| 2021/0166124 A1 * | 6/2021 | Schäfer | H04N 13/254 |

FOREIGN PATENT DOCUMENTS

| | | |
|---|---|---|
| CN | 108764455 | 11/2018 |
| CN | 109816116 A | 5/2019 |
| CN | 110363286 | 10/2019 |
| WO | 2018231708 A2 | 12/2018 |

OTHER PUBLICATIONS

Shohei Kawakami, et al. Half field of RoboCup soccer Application of deep reinforcement learning to fense tasks, Information Processing Society of Japan (IPSJ) #81st (2019) In Proceedings of the National Convention (2), Information Processing Society of Japan (IPSJ), Feb. 28, 2019, pp. 2-391 to 2-392.

Nagarajah et al., "A Review on Automated Machine Learning (AutoML) Systems," 2019 5th International Conference for Convergence in Technology (I2CT), 2019, 6 pages.

Office Action received for Korean Patent Application No. 10-2021-7025055, mailed on Apr. 30, 2024, 9 pages (5 pages of English Translation and 4 pages of Original Document).

Supplementary European Search Report issued Jul. 11, 2022 in Application No. 20832528.2, pp. 1-8.

Singaporean Office Action and Search Report issued Sep. 5, 2022 in Application No. 11202105466Q, pp. 1-12.

International Search Report issued Sep. 25, 2020 in PCT Application No. PCT/CN2020/097749 (with English Translation).

Written Opinion issued Sep. 25, 2020 in PCT Application No. PCT/CN2020/097749.

* cited by examiner

| Layer/Calculation | Hyperparameter |
|---|---|
| Convolution | Quantity of convolution kernels<br>Quantity of channels of convolution kernel<br>Width of convolution kernel<br>Height of convolution kernel<br>Stride in horizontal direction<br>Stride in vertical direction |
| Pooling | Height of pooled kernel<br>Width of pooled kernel<br>Stride in horizontal direction<br>Stride in vertical direction |
| Full connection | Quantity of neurons |
| Activation | Type of activation function<br>Parameters of various activation functions |
| Addition (add) | None |
| Concatenation (concat) | None |

FIG. 4

"batch_size": {"_type":"choice", "_value": [8, 16]},
"learning_rate": {"_type":"choice", "_value": [0.00005, 0.000075, 0.0001, 0.000125, 0.00015]},
"conv8_filter": {"_type":"choice", "_value": [2, 4, 6, 8]},
"block1_filter": {"_type":"choice", "_value": [2, 4, 6, 8]},
"block1_repeat": {"_type":"choice", "_value": [1]},
"block2_filter": {"_type":"choice", "_value": [4, 6 , 8, 12]},
"block2_repeat": {"_type":"choice", "_value": [1, 2]},
"block3_filter": {"_type":"choice", "_value": [6, 8 , 10, 12]},
"block3_repeat": {"_type":"choice", "_value": [1, 2, 3, 4, 5, 6, 7, 8]},
"block4_filter": {"_type":"choice", "_value": [8, 12, 16, 20]},
"block4_repeat": {"_type":"choice", "_value": 1, 2, 3, 4, 5, 6, 7, 8]},
"block5_filter": {"_type":"choice", "_value": [12, 16, 20, 24]},
"block5_repeat": {"_type":"choice", "_value": [1, 2, 3, 4]},
"yolo1_filter": {"_type":"choice", "_value": [12, 16, 20, 24]},
"yolo2_filter": {"_type":"choice", "_value": [10, 14, 18, 22]},
"yolo3_filter": {"_type":"choice", "_value": [8, 12, 16, 20]}

FIG. 8

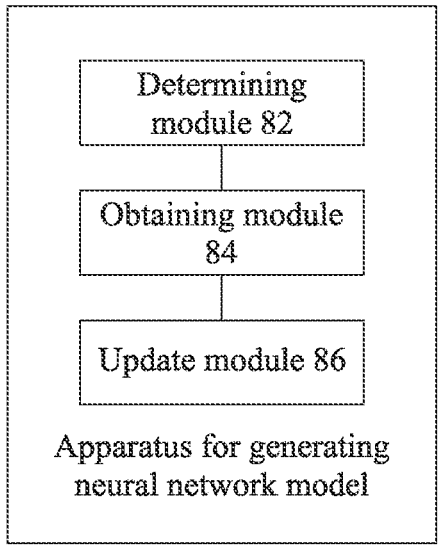

FIG. 9

Define a search space of a deep neural network in imitation learning    S901

Generate a neural network architecture    S902

Evaluate the generated neural network architecture    S903

Does the architecture meet a requirement    S904

No

Yes

Submit the neural network architecture to a training program    S905

Train imitation learning AI    S906

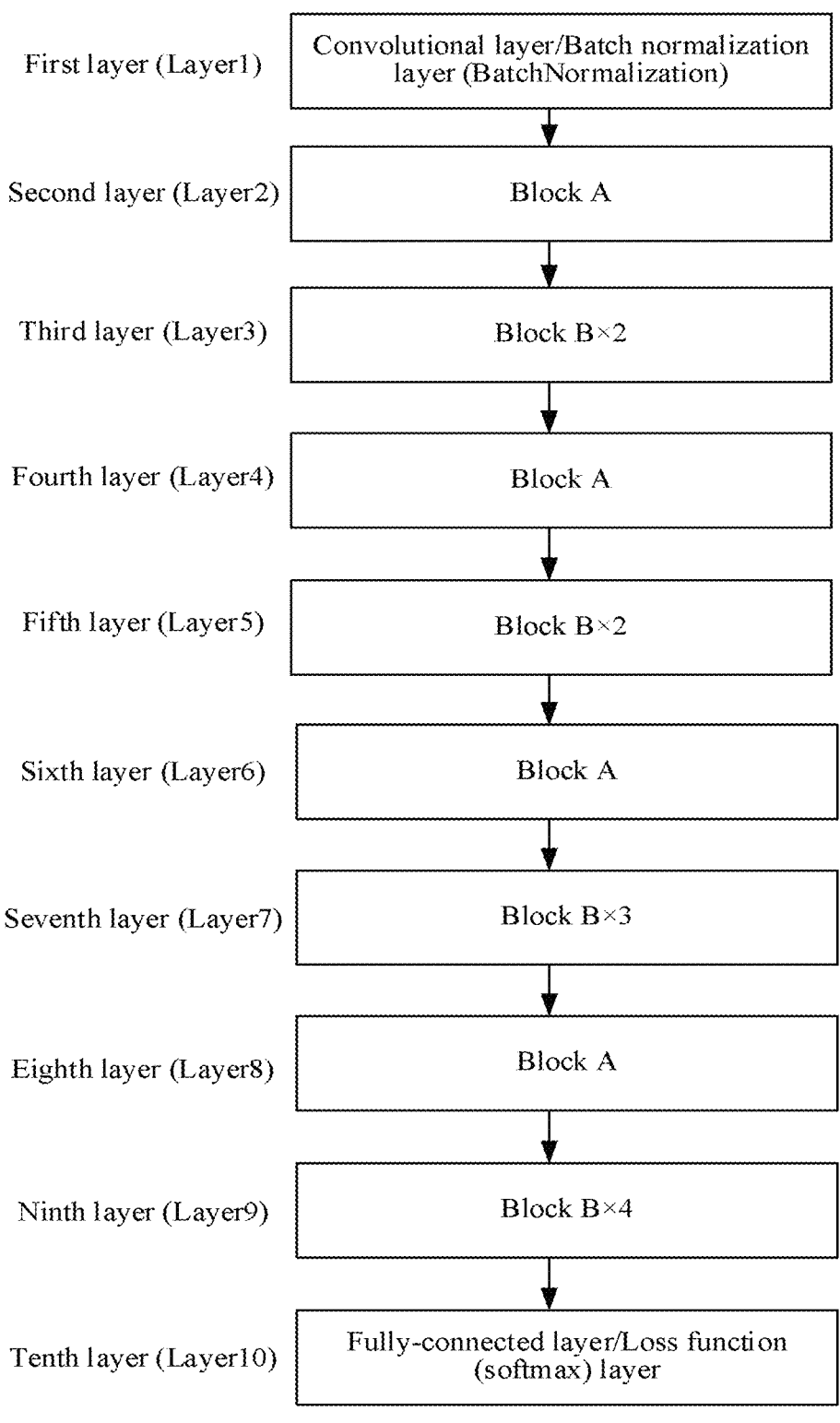

First layer (Layer1) — Convolutional layer/Batch normalization layer (BatchNormalization)

Second layer (Layer2) — Block A

Third layer (Layer3) — Block B×2

Fourth layer (Layer4) — Block A

Fifth layer (Layer5) — Block B×2

Sixth layer (Layer6) — Block A

Seventh layer (Layer7) — Block B×3

Eighth layer (Layer8) — Block A

Ninth layer (Layer9) — Block B×4

Tenth layer (Layer10) — Fully-connected layer/Loss function (softmax) layer

FIG. 11

METHOD AND APPARATUS FOR GENERATING NEURAL NETWORK MODEL, AND COMPUTER-READABLE STORAGE MEDIUM

RELATED APPLICATIONS

This application is a continuation of International Application No. PCT/CN2020/097749, filed on Jun. 23, 2020, which claims priority to Chinese Patent Application No. 201910565729.6, entitled "METHOD AND APPARATUS FOR GENERATING NEURAL NETWORK MODEL, AND COMPUTER-READABLE STORAGE MEDIUM" and filed on Jun. 27, 2019. The entire disclosures of the prior applications are hereby incorporated by reference in their entirety.

FIELD OF THE TECHNOLOGY

This application relates to the field of computers, including a method and an apparatus for generating a neural network model, and a computer-readable storage medium.

BACKGROUND OF THE DISCLOSURE

In the related art, in a process of building a neural network model, a neural network architecture is manually adjusted. This method is manual, is the method most widely used by researchers and machine learning engineers, and has a quite simple workflow, for example, including: designing an imitation learning process for game artificial intelligence (AI), then, iterating different neural network model architectures in sequence, training an imitation learning model weight of the neural network architecture, and applying the weight to a game for observing an AI effect until the model meets the requirements of AI. Moreover, conventional adjustments of a neural network model do not yield highly accurate results at each adjustment iteration, thereby prolonging the amount of time needed to build the neural network.

Conventional methods of designing a neural network architecture also require developers to have rich experience in deep learning and the neural network architecture, and only in this way can a neural network architecture that meets the requirements of AI be designed. If there is a lack of experience in machine learning, it is difficult to design a machine learning model with excellent performance. Secondly, in a conventional solution, when machine learning is applied to a new application, neural network architectures designed for different applications require time-consuming adjustment in order adapt to the new application, and often multiple neural network architectures must be tried before one is chosen, which adds to the development costs and time.

There is still no effective solution to the foregoing problems in the related art at present.

SUMMARY

In an exemplary aspect, in a method for an electronic device to generate a neural network model that controls a game element in a game, a hyperparameter value corresponding to a hyperparameter in a first neural network model is determined from a hyperparameter value set. The first neural network model includes an input layer, a structural layer having the hyperparameter value, and an output layer, and the input layer, the structural layer, and the output layer are connected in a target connection. A first model accuracy of a second neural network model is obtained by training the first neural network model, and hyperparameter values of some hyperparameters in the first neural network model are updated to corresponding target hyperparameter values in the hyperparameter value set when the first model accuracy is lower than a target accuracy in order to obtain a third neural network model. A second model accuracy of detecting a verification sample set by using a fourth neural network model is higher than or equal to the target accuracy, and the fourth neural network model is obtained by training the third neural network model.

In an exemplary aspect, an apparatus for generating a neural network model applicable to a game includes processing circuitry that determined a hyperparameter value corresponding to a hyperparameter in a first neural network model from a hyperparameter value set. The first neural network model is a neural network model obtained by connecting at least an input layer, a structural layer having the hyperparameter value, and an output layer in a target connection. The processing circuitry obtains a first model accuracy of a second neural network model by training the first neural network model, and updates hyperparameter values of some hyperparameters in the first neural network model to corresponding target hyperparameter values in the hyperparameter value set when the first model accuracy is lower than a target accuracy, to obtain a third neural network model. A second model accuracy of detecting a verification sample set by using a fourth neural network model is higher than or equal to the target accuracy, and the fourth neural network model is obtained by training the third neural network model.

In an exemplary aspect, a non-transitory computer-readable medium stores instructions which when executed by at least one processor cause the at least one processor to determine a hyperparameter value corresponding to a hyperparameter in a first neural network model from a hyperparameter value set. The first neural network model includes an input layer, a structural layer having the hyperparameter value, and an output layer, and the input layer, the structural layer, and the output layer are connected in a target connection. The at least one processor also obtains a first model accuracy of a second neural network model by training the first neural network model, and updates hyperparameter values of some hyperparameters in the first neural network model to corresponding target hyperparameter values in the hyperparameter value set when the first model accuracy is lower than a target accuracy, to obtain a third neural network model. A second model accuracy of detecting a verification sample set by using a fourth neural network model is higher than or equal to the target accuracy, and the fourth neural network model is obtained by training the third neural network model.

In the embodiments of this application, the hyperparameter value corresponding to the hyperparameter in the first neural network model is determined from the hyperparameter value set, the first model accuracy of the second neural network model obtained by training the first neural network model is obtained, and hyperparameter values of some hyperparameters in the first neural network model are updated to corresponding target hyperparameter values in the hyperparameter value set in a case that the first model accuracy is lower than a target accuracy, to obtain the third neural network model. In addition, the second model accuracy of detecting the verification sample set by using the fourth neural network model obtained by training the third neural network model is higher than or equal to the target accuracy. In this way, during the adjustment of the hyperparameter value, some hyperparameter values are adjusted according to a model accuracy of a current model, so that a range of adjusted hyperparameters can be narrowed, thereby improving the efficiency of generating a neural network model.

BRIEF DESCRIPTION OF THE DRAWINGS

Accompanying drawings described herein are used for providing further understanding about the embodiments of this application and form a part of the embodiments of this application. Exemplary embodiments of this application and descriptions thereof are used solely for explaining the embodiments of this application, and are therefore not limiting. In the drawings:

FIG. 4 is a schematic diagram of types of hyperparameters of various typical layers according to an embodiment of this application.

FIG. 8 is a schematic diagram of a definition file of a neural network search space configured in a Bayesian optimization algorithm according to an embodiment of this application.

FIG. 9 is a schematic diagram of an apparatus for generating a neural network model according to an embodiment of this application.

FIG. 11 is a schematic diagram of a neural network architecture that meets a requirement of a specific game according to an embodiment of this application.

DESCRIPTION OF EMBODIMENTS

To make a person skilled in the art better understand the solutions in the embodiments of this application, the following describes the technical solutions in the embodiments of this application with reference to the accompanying drawings in the embodiments of this application. As can be appreciated, the described embodiments are only some of the embodiments of this application rather than all of the embodiments. All other embodiments obtained by a person of ordinary skill in the art based on the embodiments of this application without creative efforts shall fall within the protection scope of the embodiments of this application.

In the specification, claims, and accompanying drawings of this application, the terms "first", "second", and the like are intended to distinguish between similar objects rather than describe a specific order or sequence. The data termed in such a way are interchangeable in proper circumstances, so that the embodiments of this application described herein can be implemented in orders other than the order illustrated or described herein. Moreover, the terms "include" and "contain" and any other variants thereof mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

Figure 1:
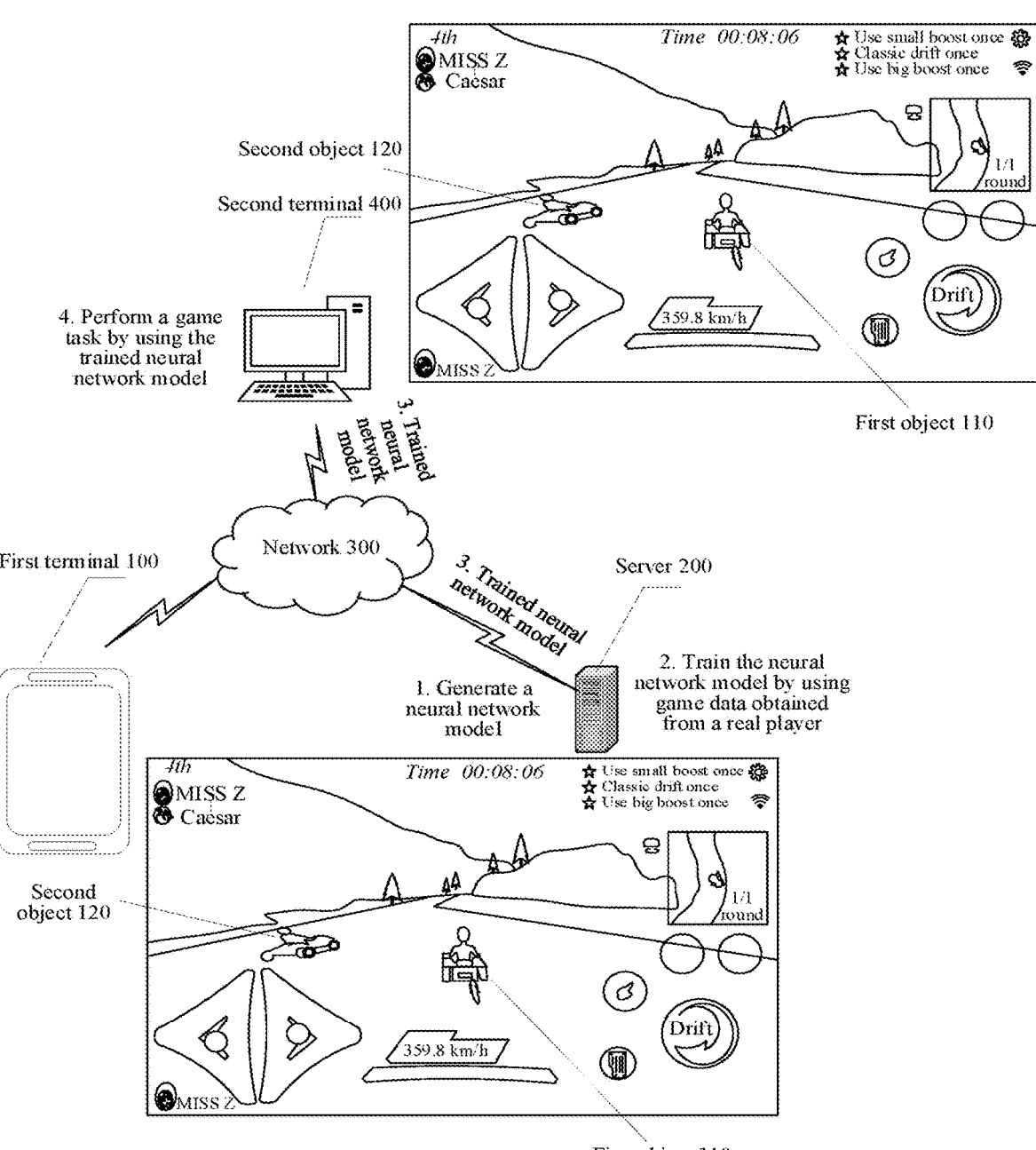
FIG. 1 is a schematic diagram of a system architecture for generating a neural network model according to an embodiment of this application.

FIG. 1 is a schematic diagram of a system architecture for generating a neural network model according to an embodiment of this application. As shown in FIG. 1, the system architecture includes a first terminal 100, a server 200, a network 300, and a second terminal 400. To support an exemplary application, the first terminal 100 and the second terminal 400 are respectively connected to the server 200 by using the network 300. The first terminal 100 may be a smart terminal controlled by a real player. The smart terminal may be any terminal with a screen display function, for example, a notebook computer, a tablet computer, a desktop computer, or a mobile device (for example, a mobile phone, a portable music player, a personal digital assistant, a dedicated messaging device, or a portable game device). The second terminal 400 may be a smart robot, for example, may be a game robot. The network 300 may be a wide area network, a local area network, or a combination of the wide area network and the local area network, and achieves data transmission by using a radio link. The network 300 may also be wireless or wired, or a combination of wireless and wired, as one of ordinary skill will recognize.

The server 200 may generate a neural network model according to the method for generating a neural network model applicable to a game provided in this embodiment of this application, acquire data generated when a real player plays a game, to obtain training data, further train the generated neural network model according to the training data, and deliver the trained neural network model to the second terminal 400. The second terminal 400 controls a game element in a game match based on the trained neural network model to complete a corresponding game task such as a man-machine battle task, a game-playing company task, or an auto idle task.

The server 200 may be an independent physical server, or may be a server cluster including a plurality of physical servers or a distributed system, or may be a cloud server based on a cloud technology. The cloud technology is a hosting technology that unifies a series of resources such as hardware, software, and networks in a wide area network or a local area network to implement computing, storage, processing, and sharing of data. In this embodiment of this application, when the server 200 is a cloud server, an AI cloud service provided by the server 200 may include generating a neural network model and training the generated neural network model based on training data, so that the neural network model can learn of operation skills (reflected as neural network model parameters) in an interaction process.

The training data is basic game information, real-time scene information, and operation data of a real player in a fighting process when the real player controls a game role to fight. The basic game information may include whether the game role controlled by the real player wins, a size of a scene (a scene is a space in a game for an object to move, for example, an arena in a battle game), and a total cooldown time of each skill. The scene data includes a position of our side (the position of the game role controlled by the real player), a position of an opponent (a game role fighting against the game role controlled by the real player), a current cooldown time of each skill of our side, and a current cooldown time of each skill of the opponent. Operation data includes a skill usage mode (whether each skill is released and whether to perform a normal attack), an angle by which a joystick moves, whether the game role controlled by the real player jumps, and the like.

When the generated neural network model is trained by using the training data, a loss function including an input layer, an output layer, and a neural network model parameter is initialized first. In each iterative training process of the neural network model, the training data is substituted into the loss function, to solve a corresponding neural network model parameter in a case that a minimum value of the loss function is obtained, and the neural network model is updated according to the solved neural network model parameter.

In an example, after acquiring the trained neural network model, the second terminal 400 executes a man-machine battle task against the first terminal 100. The first terminal 100 and the second terminal 400 output virtual scenes of a game application, including a first object 110 and a second object 120. The first object 110 may be a game role controlled by a user (also referred to as a real player to distinguish the user from a robot model). The first object 110 is controlled by a real player and moves in the virtual scene in response to an operation performed by the real player on a controller (including a keyboard, a mouse, a joystick, and the like) in the first terminal 100. The server acquires real-time game data of the real player and sends the data to the second terminal 400. The second terminal 400 predicts, based on the trained neural network model, operation data to be executed by the second object 120, and implements a corresponding behavior by controlling the second object 120 to execute the operation data, thereby achieving intelligent interaction between the first object 110 and the second object 120.

Figure 2:
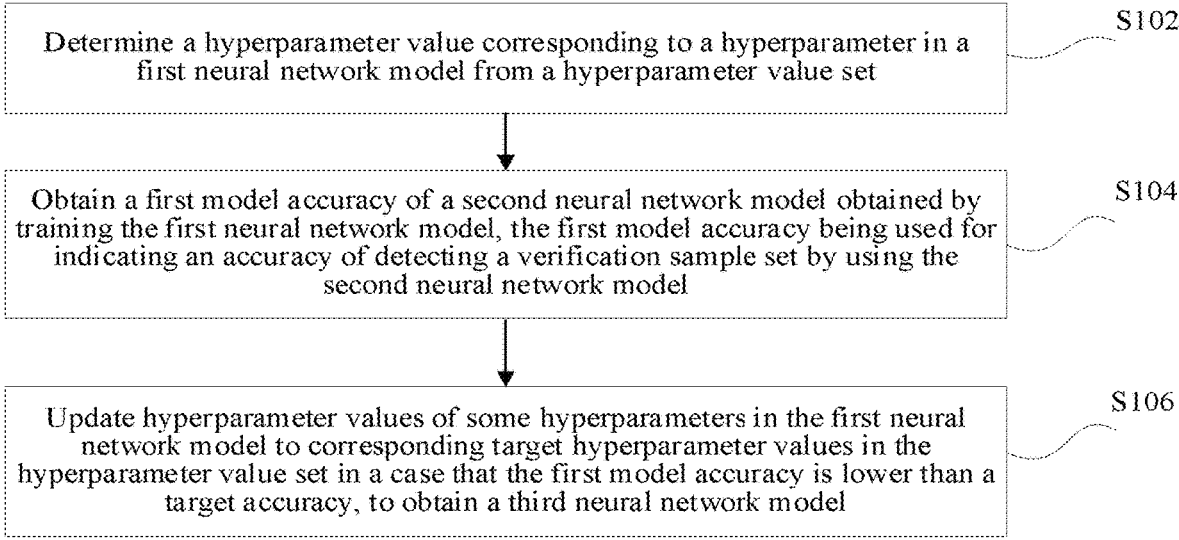
FIG. 2 is a schematic diagram of a method for generating a neural network model applicable to a game according to an embodiment of this application.

In this embodiment of this application, an implementation of generating, by using a server, a neural network model applicable to a game is described. FIG. 2 shows a method for generating a neural network model applicable to a game according to an embodiment of this application. As shown in FIG. 2, the method includes the following steps.

In step S102, a hyperparameter value corresponding to a hyperparameter in a first neural network model is determined from a hyperparameter value set.

The first neural network model is a neural network model obtained by connecting at least an input layer, a structural layer having the hyperparameter value, and an output layer in a target connection manner.

In step S104, a first model accuracy of a second neural network model obtained by training the first neural network model is obtained.

The first model accuracy is used for indicating an accuracy of detecting a verification sample set by using the second neural network model.

In step S106, hyperparameter values of some hyperparameters in the first neural network model are updated to corresponding target hyperparameter values in the hyperparameter value set in a case that the first model accuracy is lower than a target accuracy in order to obtain a third neural network model.

a second model accuracy of detecting a verification sample set by using a fourth neural network model being higher than or equal to the target accuracy, the fourth neural network model being obtained by training the third neural network model.

The generated third neural network model may be configured to control a game element for an operation in a game. The game element is an element that can be controlled by a user or a background in a game match, including, but not limited to, a game role and an organization unit (such as a building, a resource, or an army unit) in a game match.

Figure 3:
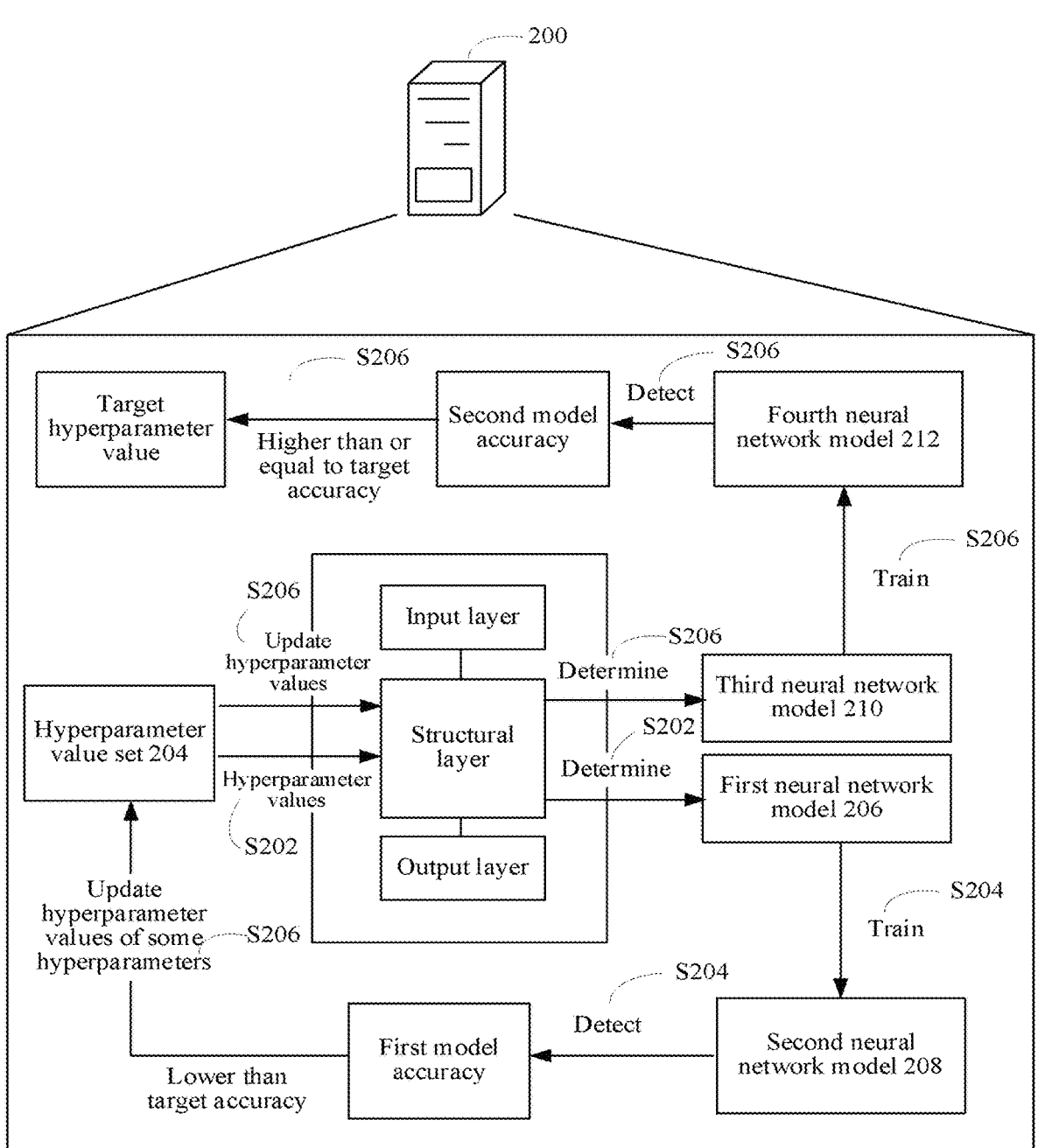
FIG. 3 is a schematic diagram of an application environment for generating a neural network model according to an embodiment of this application.

In this embodiment of this application, the foregoing method for generating a neural network model may be applied to a hardware environment formed by a server 200 shown in FIG. 3. As shown in FIG. 3, a processing procedure of the server 200 includes the following steps. In step S202, the server 200 determines a hyperparameter value corresponding to a hyperparameter in a first neural network model 206 from a hyperparameter value set 204. The first neural network model is a neural network model obtained by connecting an input layer, a structural layer having the hyperparameter value, and an output layer in a target connection manner. In step S204, the server 200 obtains a first model accuracy of a second neural network model 208 obtained by training the first neural network model. The first model accuracy is used for indicating an accuracy of detecting a verification sample set by using the second neural network model 208. In step S206, the server 200 updates hyperparameter values of some hyperparameters in the first neural network model 206 to corresponding target hyperparameter values in the hyperparameter value set in a case that the first model accuracy is lower than a target accuracy, to obtain a third neural network model 210. A second model accuracy of detecting the verification sample set by using a fourth neural network model 212 obtained by training the third neural network model 210 is higher than or equal to the target accuracy.

In this embodiment of this application, the method for generating a neural network model may be applied to, but not limited to, a scenario of generating a neural network model for an application. The foregoing application may be, but is not limited to, applications of various types, for example, an on-line education application, an instant messaging application, a community space application, a game application, a shopping application, a browser application, a financial application, a multimedia application, and a live streaming application. In a case that the method for generating a neural network model is applied to applications other than a game application, the method is actually applied to game scenes of the applications, so as to improve the efficiency of generating a neural network model. This is merely an example, and this embodiment of this application is not limited thereto.

In this embodiment of this application, in a context of machine learning, the hyperparameter is a parameter of which a value is set before the learning process is started. Values of other parameters are obtained through training. For example, hyperparameters of a convolutional layer include a quantity of convolution kernels, a quantity of channels, the height, and the width of a convolution kernel, a stride in a horizontal direction, and a stride in a vertical direction, and the like. Hyperparameters of a fully-connected layer include a quantity of neurons. Hyperparameters of an activation function layer include a type of an activation function, a parameter of the function, and the like. FIG. 4 shows types of hyperparameters of various typical layers.

In this embodiment of this application, a neural network model is divided into an input layer, a structural layer, and an output layer. Hyperparameters of the input layer and the output layer are determined, and only hyperparameters of the structural layer are adjusted in a process of generating the neural network model.

In this embodiment of this application, each time a neural network model is obtained, an accuracy of the neural network model is verified by using a training sample set and a verification sample set. For a model of which an accuracy does not meet a condition (that is, the first model accuracy is lower than the target accuracy), some hyperparameters of the structural layer are adjusted to obtain a new model. A model of which an accuracy meets a condition (that is, the first model accuracy is higher than or equal to the target accuracy) is determined as the target model.

In view of this, through the foregoing steps, the neural network model is divided into the input layer, the structural layer having the hyperparameter value, and the output layer. The hyperparameters of the structural layer are adjusted. During the adjustment, hyperparameter values of some of the hyperparameters of the structural layer are adjusted according to a model accuracy of a current model, so that a range of adjusted hyperparameters is narrowed, thereby improving the efficiency of generating a neural network model and further resolving the technical problem of relatively low efficiency of generating a neural network model.

In some embodiments of this application, the structural layer includes a first residual network and a second residual network, and the determining a hyperparameter value corresponding to a hyperparameter in a first neural network model from a hyperparameter value set includes the following steps.

In step S1, a first hyperparameter value corresponding to a first hyperparameter of the first residual network is determined from a first hyperparameter value subset. A plurality of hyperparameters of the first residual network includes the first hyperparameter.

In step S2, a second hyperparameter value corresponding to a second hyperparameter of the second residual network is determined from a second hyperparameter value subset, a plurality of hyperparameters of the second residual network including the second hyperparameter, and the hyperparameter value set including the first hyperparameter value subset and the second hyperparameter value subset.

Figure 5:
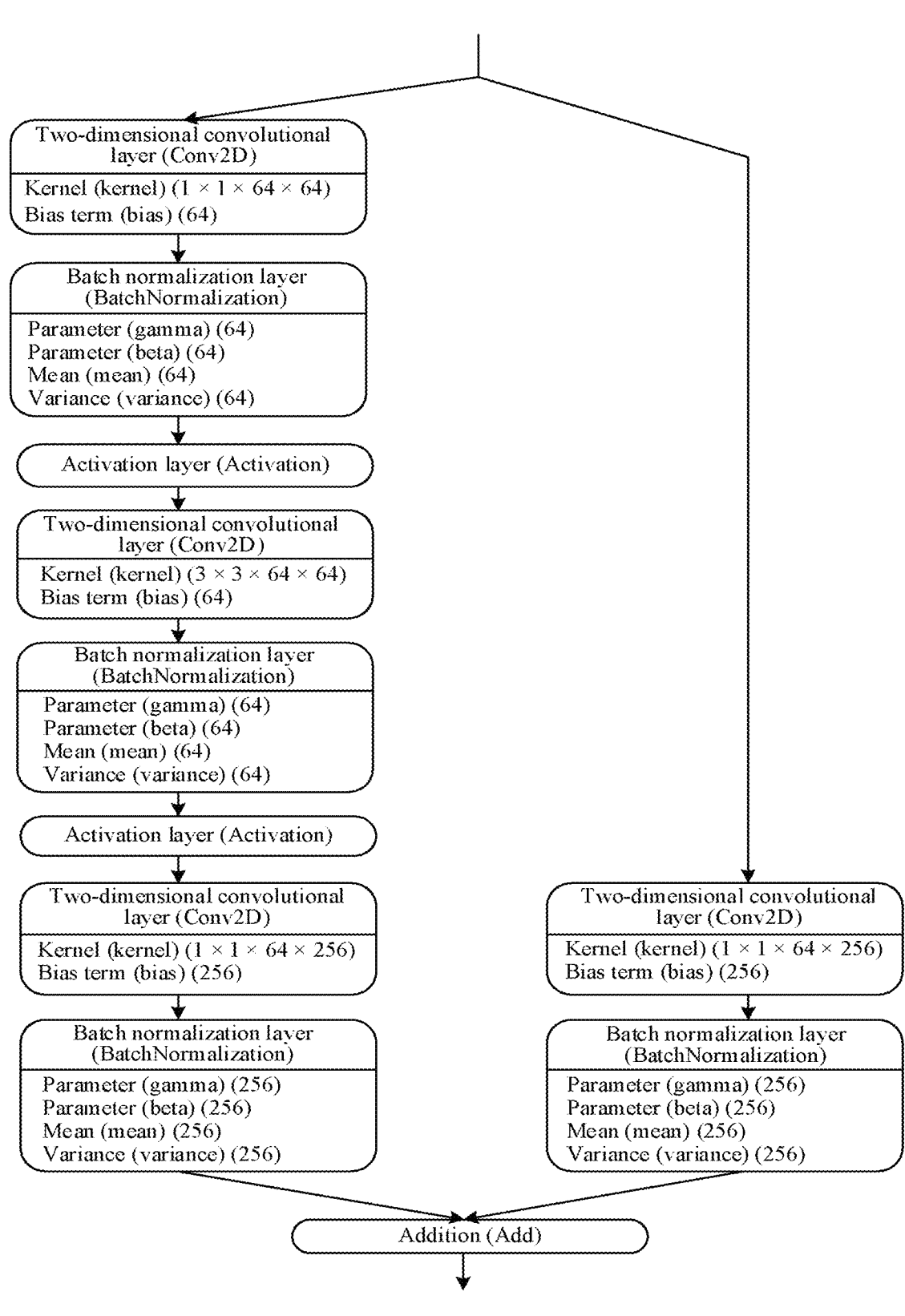
FIG. 5 is a schematic diagram of a residual structure of a block A according to an embodiment of this application.
Figure 6:
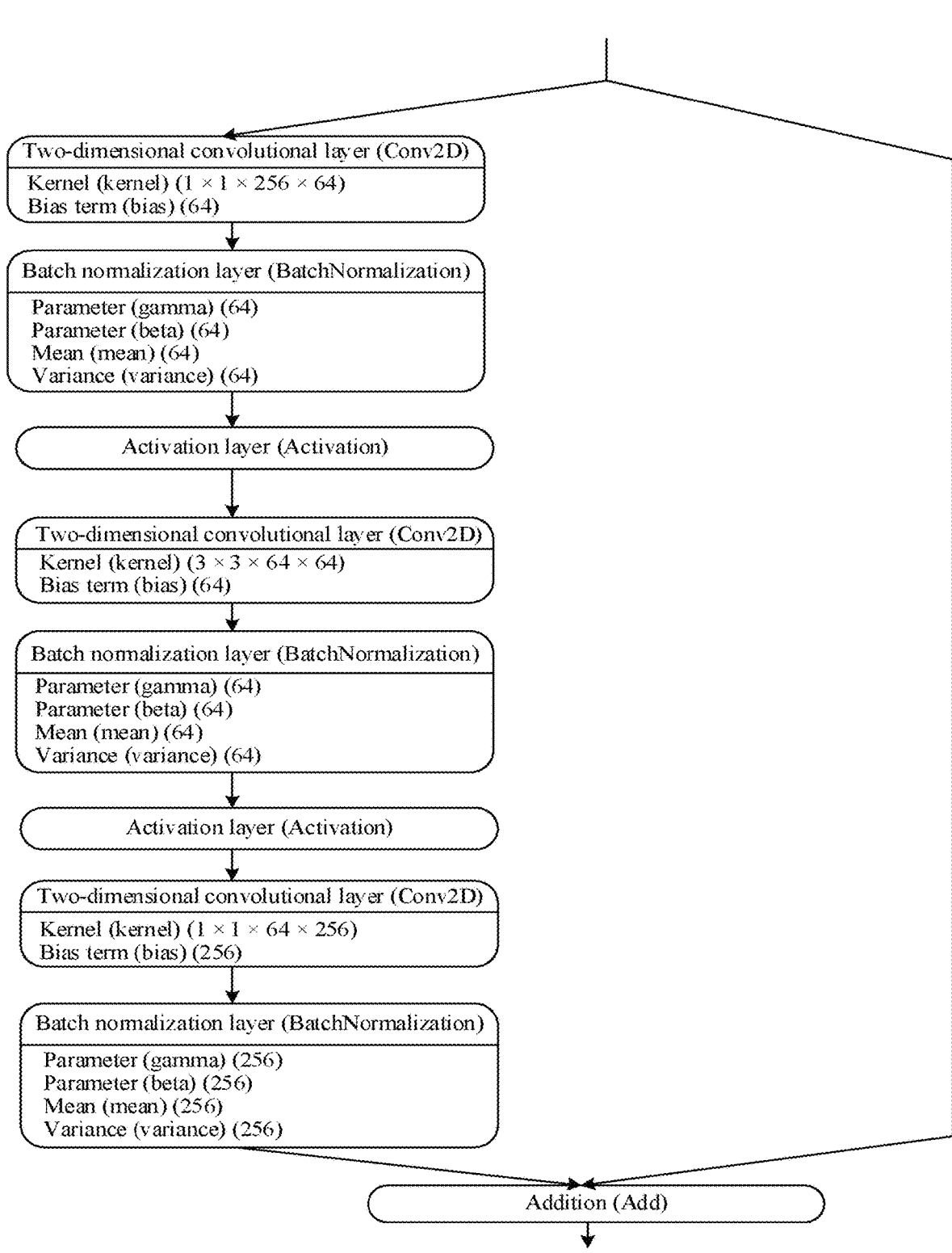
FIG. 6 is a schematic diagram of a residual structure of a block B according to an embodiment of this application.

In this embodiment of this application, a deep residual network ResNet50 is used as a basic model. A standard ResNet50 network architecture is a very deep network. Residual structures used in the ResNet50 network may be abstracted and referred to as block A and block B. FIG. 5 shows a residual structure of the block A. FIG. 6 shows a residual structure of the block B.

In this embodiment of this application, the first residual network may be, but is not limited to, the block A, and the second residual network may be, but is not limited to, the block B.

In this embodiment of this application, for the structure of the block A, it is acceptable to explore only the first hyperparameter thereof. For the structure of the block B, the second hyperparameter thereof may be explored.

In this embodiment of this application, the structural layer includes a plurality of first residual networks and a plurality of second residual networks, the hyperparameter value set includes a plurality of first hyperparameter value subsets and a plurality of second hyperparameter value subsets, the plurality of first residual networks are in a one-to-one correspondence with the plurality of first hyperparameter value subsets, and the plurality of second residual networks are in a one-to-one correspondence with the plurality of second hyperparameter value subsets.

In S1, the determining of the first hyperparameter value corresponding to a first hyperparameter of the first residual network from a first hyperparameter value subset includes determining a first hyperparameter value corresponding to a first hyperparameter of a target first residual network from each first hyperparameter value subset in the plurality of first hyperparameter value subsets. The target first residual network being a first residual network corresponding to the each first hyperparameter value subset.

In S2, the determining of the second hyperparameter value corresponding to a second hyperparameter of the second residual network from a second hyperparameter value subset includes determining a second hyperparameter value corresponding to a second hyperparameter of a target second residual network from each second hyperparameter value subset in the plurality of second hyperparameter value subsets. The target second residual network being a second residual network corresponding to the each second hyperparameter value subset.

Figure 7:
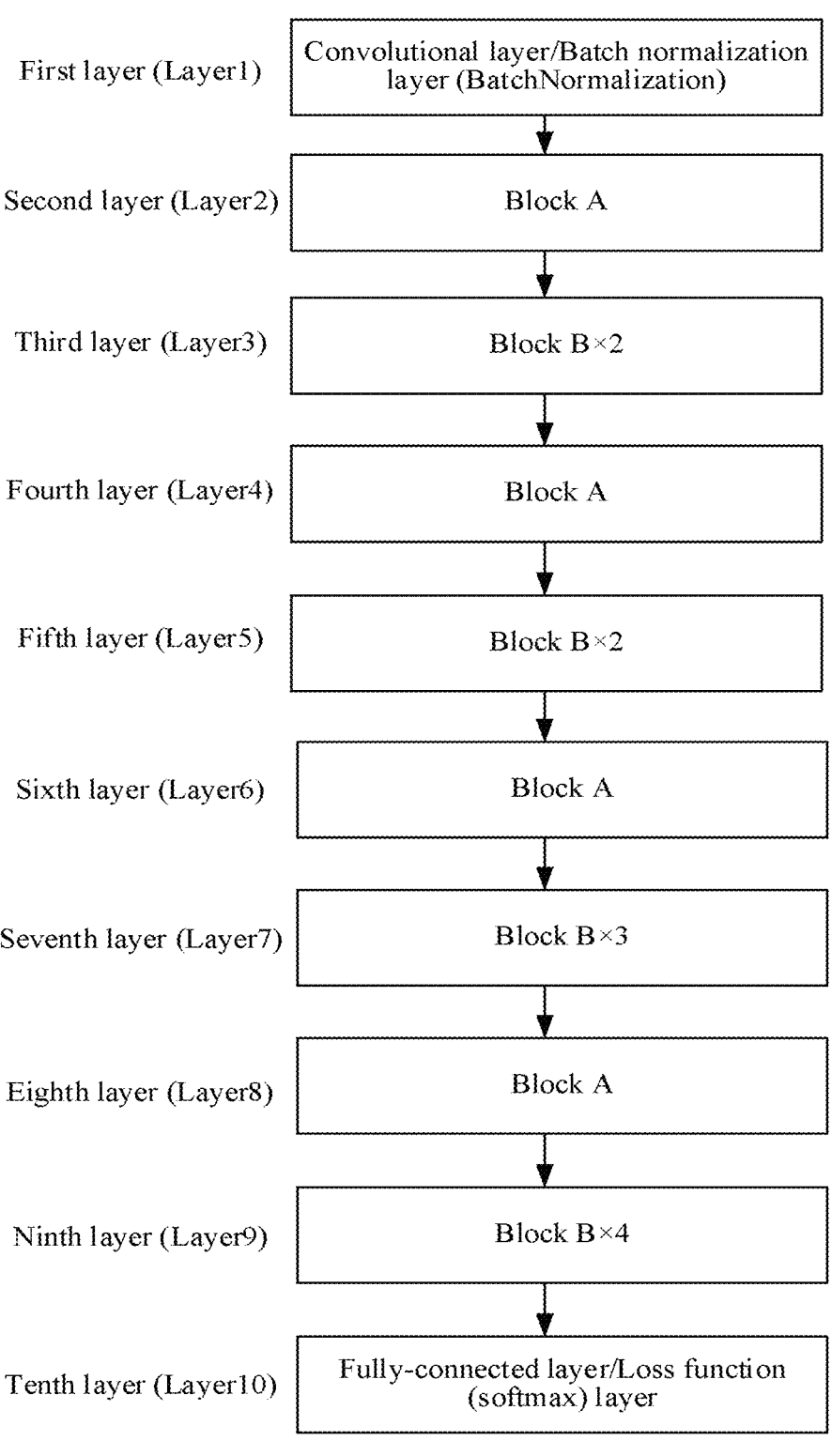
FIG. 7 is a schematic diagram of an abstracted ResNet50 network architecture according to an embodiment of this application.

In this embodiment of this application, residual networks of the ResNet50 includes a plurality of blocks A and a plurality of blocks B. FIG. 7 shows an abstracted ResNet50 network architecture. Layer1 is an input layer of the ResNet50. Layer2, Layer4, Layer6, and Layer8 are of block A structures. Layer3, Layer5, Layer7, and Layer9 are of block B structures, where ×2 represents that two block B structures are concatenated. Block B×3 and block B×5 in subsequent layers represent that three or five block B structures are concatenated to form a large structure. Layer10 is an output layer.

In this embodiment of this application, each first hyperparameter value subset is equivalent to a search space of each first hyperparameter, and each second hyperparameter value subset is equivalent to a search space of each second hyperparameter.

In this embodiment of this application, the updating hyperparameter values of some hyperparameters in the first neural network model to corresponding target hyperparameter values in the hyperparameter value set includes at least one of the following steps.

In step S1, first hyperparameter values corresponding to first hyperparameters of some first residual networks are updated to third hyperparameter values corresponding to the some first residual networks.

The third hyperparameter values are hyperparameter values in the first hyperparameter value subset.

In step S2, second hyperparameter values corresponding to second hyperparameters of some second residual networks are updated to fourth hyperparameter values corresponding to the some second residual networks in the second hyperparameter value subset.

The fourth hyperparameter values are hyperparameter values in the second hyperparameter value subset.

In this embodiment of this application, the hyperparameters may be updated by using, but not limited to, a Bayesian optimization algorithm, grid search, random search, and the like.

The Bayesian optimization algorithm is used as an example in some embodiments of this application. A posterior probability distribution of previous n points is calculated through Gaussian process regression (assuming that the hyperparameters satisfy a joint Gaussian distribution) for existing sample points, and an expected mean and an expected variance of each hyperparameter at each data point are obtained. The mean represents a final expected effect of the point. A larger mean indicates a larger final index of the model. The variance represents the uncertainty of the effect of the point. A larger variance indicates higher necessity of exploring the uncertainty of whether a maximum value can be obtained at the point. A Bayesian optimization algorithm provided in a neural network intelligence (NNI) machine learning package may be used, but this application is not limited thereto. FIG. 8 shows a definition file of a neural network search space configured in a Bayesian optimization algorithm according to an embodiment of this application. A group of structural parameters of a neural network are recommended by the Bayesian optimization algorithm according to the definition file shown in FIG. 8. For example, a convolution kernel size (that is, a size of a convolution kernel) of Layer2/Layer4/Layer6/Layer8 is respectively [16, 16, 64, 128], and a quantity of repetitions of the block B in Layer3/Layer5/Layer7/Layer9 is respectively [2, 3, 5, 4]. The server generates a corresponding neural network by using the two groups of parameters.

In this embodiment of this application, the structural layer includes the first residual network and the second residual network. The first hyperparameter includes a convolution kernel size of a first convolution kernel in convolution kernels included in the first residual network. The second hyperparameter includes a quantity of the concatenated second residual networks. The determining a hyperparameter value corresponding to a hyperparameter in a first neural network model from a hyperparameter value set includes the following steps.

In step S1, the convolution kernel size of the first convolution kernel in the first residual network is determined from a third hyperparameter value subset as a target convolution kernel size value.

In step S2, the quantity of the concatenated second residual networks is determined from a fourth hyperparameter value subset as a target quantity. The hyperparameter value set including the third hyperparameter value subset and the fourth hyperparameter value subset.

In this embodiment of this application, the search space may be reduced to a range from Layer2 to Layer9 according to the abstracted ResNet50 network architecture. Layer1 and Layer10 do not need to be explored. In addition, it may be found that a convolution kernel size of a network is key to affecting the execution performance and accuracy of the network, and therefore, it is acceptable to explore only a size of a convolution kernel thereof for the structure of the block A. A quantity of repeated structures thereof is mainly explored for the block B. The search space may be determined in the following manner.

For Layer2, Layer4, Layer6, or Layer8, a convolution kernel size of the first convolutional layer thereof is searched for, because the size of the first convolution kernel affects sizes of subsequent convolution kernels. For example, if the block A structure is used for Layer2, a convolution kernel size of the first convolutional layer in Layer2 may be explored, a default value used by the ResNet50 is 1×1×64× 64, the last value may be explored, and a search space may be [16, 32, 64, 128] (which is equivalent to the foregoing first hyperparameter value subset). Therefore, there are the following combinations for the convolution kernels of the first convolutional layer of Layer2: 1×1×64×16, 1×1×64×32, 1×1×64×64, and 1×1×64×128. Similarly, four different integer parameters may also be used as exploration items for parameters of convolution kernels in other layers.

Because the four layers, Layer3, Layer5, Layer7, and Layer9, are repetitions of the block B, an appropriate quantity of repetitions of the block B may be explored for each layer. For example, for Layer3, in the ResNet50, the block B structure is repeated once by default, and a search space may be defined as [1, 2, 3, 4, 5, 6, 7] (which is equivalent to the foregoing second hyperparameter value subset). For the subsequent Layer5, Layer7, or Layer9, a search space thereof may also be set to [1, 2, 3, 4, 5, 6, 7].

In this embodiment of this application, according to the foregoing definition of the search space, a range of an entire search space is about 44×74=614, 656. The search space is reduced by 4 orders of magnitude compared with a search space that often includes billions of values when a new neural network architecture is searched, thereby greatly reducing the hardware costs.

In this embodiment of this application, the obtaining a first model accuracy of a second neural network model obtained by training the first neural network model includes the following steps.

In step S1, the first neural network model is trained by using a first training sample set obtained from a target application, to obtain the second neural network model.

In step S2, by using the second neural network model, each verification sample is detected in a verification sample set obtained from the target application, to obtain a detection result corresponding to the each verification sample in the verification sample set. The verification sample set includes a plurality of verification samples obtained from the target application and a target detection result corresponding to the each verification sample.

In step S3, a proportion of a quantity of matches in a total quantity of the plurality of verification samples is determined as the first model accuracy. The quantity of matches are used for indicating a quantity of verification samples of which detection results corresponding to the verification samples match target detection results corresponding to the verification samples.

In this embodiment of this application, an evaluation value of the neural network (that is, the accuracy of the model) is required in the Bayesian optimization algorithm, so that the optimized neural network architecture can be continuously generated based on the evaluation value. Whether the neural network meets a requirement can be determined with the help of the evaluation value. First, some training samples are divided from the training samples for an evaluation of a neural network architecture search. Second, the some training samples may further be divided into a training set and a verification set. Supervised learning training is performed for all the generated neural network models based on the training set, and then the accuracy of a model is obtained based on the verification set. The accuracy is used as an evaluation value of the neural network architecture. In the Bayesian optimization algorithm, after a neural network architecture is generated, an evaluation value of the neural network architecture is received. Then, in the Bayesian optimization algorithm, an updated neural network architecture is generated based on the evaluation value.

In this embodiment of this application, after the updating hyperparameter values of some hyperparameters in the first neural network model to corresponding target hyperparameter values in the hyperparameter value set, to obtain a third neural network model, the method further includes the following steps.

In step S1, the third neural network model is trained by using a second training sample set obtained from a target application, to obtain a fourth neural network model.

The target application in this embodiment of this application may be a game application. In this case, the second training sample set includes scene data generated when a real player controls a game role to play a game and operation data of the real player. The scene data includes a size of a scene, a position of the game role controlled by the real player, a position of a game role fighting against the game role controlled by the real player, a current cooldown time of each skill of the real player, and the like. Operation data includes a skill usage mode, an angle by which a joystick moves, whether the game role controlled by the real player jumps, and the like.

During the implementation of step S1, the third neural network model is trained by using the scene data included in the second training sample set as an input and the operation data included in the second training sample set as an output.

When the third neural network model is trained, a loss function including the input corresponding to the scene data, the output corresponding to the operation data, and a third neural network model parameter is initialized at first. The scene data in the second training sample set is inputted into the third neural network model in each iterative training process of the third neural network model, to obtain predicted operation data. In addition, operation data selected from the training sample set and the predicted operation data are substituted into the loss function, to solve a corresponding third neural network model parameter in a case that a minimum value of the loss function is obtained. The third neural network model is updated according to the solved third neural network model parameter.

In step S2, to-be-detected data is detected in the target application by using the fourth neural network model.

In this embodiment of this application, the generated third neural network model may be configured to detect data in the target application, for example, perform tasks such as image detection, image segmentation, and imitation learning, but this application is not limited thereto.

In this embodiment of this application, the input layer includes a convolutional layer, a batch normalization layer, and an activation layer, the output layer includes a fully-connected layer and a loss function layer, and the structural layer includes four layers of first residual networks and four layers of second residual networks. The first neural network model is a neural network model obtained by connecting an input layer, a structural layer having the hyperparameter value, and an output layer in a target connection manner.

In the target connection manner, the input layer, the structural layer having the hyperparameter value, and the output layer are connected in a concatenation manner, to obtain the first neural network model. The convolutional layer, the batch normalization layer, and the activation layer are concatenated. The fully-connected layer and the loss function layer are concatenated. The first layer of first residual network, the first layer of second residual network, the second layer of first residual network, the second layer of second residual network, the third layer of first residual network, the third layer of second residual network, the fourth layer of first residual network, and the fourth layer of second residual network are concatenated. The hyperparameter values of the structural layer include a convolution kernel size of each layer of first residual network in the four layers of first residual networks, and a quantity of the concatenated second residual networks in each layer of the four layers of second residual networks.

In this embodiment of this application, in the foregoing network architecture of the ResNet50, the input layer Layer1 is the first convolutional layer input of the ResNet50 and may include a convolutional layer, a batch normalization layer (BatchNormalization layer), and an activation layer. The output layer Layer10 may include a fully-connected layer and a loss function layer (softmax layer).

In this embodiment of this application, the structural layer includes the first layer of first residual network Layer2, the first layer of second residual network Layer3, the second layer of first residual network Layer4, the second layer of second residual network Layer5, the third layer of first residual network Layer6, the third layer of second residual network Layer7, the fourth layer of first residual network Layer8, and the fourth layer of second residual network Layer9.

For the ease of description, the foregoing method embodiments are expressed as a series of action combinations, but a person skilled in the art is to learn that because some steps may be performed in other sequences or simultaneously according to the embodiments of this application, the embodiments of this application are not limited to the described action sequence. In addition, a person skilled in the art is further to learn that the related actions and modules in the embodiments described in the specification are not necessarily mandatory to the embodiments of this application.

Through the descriptions of the foregoing implementations, a person skilled in the art may clearly understand that the method according to the foregoing embodiments may be implemented by software and a necessary general hardware platform, and certainly, may also be implemented by hardware, but in many cases, the former manner is a better implementation. Based on such an understanding, the technical solutions of the embodiments of this application essentially, or the part contributing to the related art, or all or some of the technical solutions may be implemented in the form of a software product. The computer software product is stored in a non-transitory storage medium (such as a read-only memory (ROM)/random access memory (RAM), a magnetic disk, or an optical disk), and includes several instructions for instructing a terminal device (which may be a mobile phone, a computer, a server, a network device, and the like) to perform the method described in the embodiments of this application.

According to another aspect of the embodiments of this application, an apparatus for generating a neural network model configured to implement the method for generating a neural network model is further provided. As shown in FIG. 9, the apparatus includes a determining module 82 (circuitry) configured to determine a hyperparameter value corresponding to a hyperparameter in a first neural network model from a hyperparameter value set, where the first neural network model is a neural network model obtained by connecting at least an input layer, and a structural layer has the hyperparameter value, and an output layer in a target connection manner. The apparatus also includes an obtaining module 84 configured to obtain a first model accuracy of a second neural network model obtained by training the first neural network model. The first model accuracy is used for indicating an accuracy of detecting a verification sample set by using the second neural network model. The apparatus further includes an update module 86 configured to update hyperparameter values of some hyperparameters in the first neural network model to corresponding target hyperparameter values in the hyperparameter value set in a case that the first model accuracy is lower than a target accuracy, to obtain a third neural network model. A second model accuracy of detecting a verification sample set by using a fourth neural network model is higher than or equal to the target accuracy, and the fourth neural network model is obtained by training the third neural network model. As can be appreciated, these modules may be implemented by circuitry (processing circuitry) that performs the described functions.

In some embodiments of this application, the structural layer includes a first residual network and a second residual network, and the determining module includes a second determining unit configured to determine a second hyperparameter value corresponding to a second hyperparameter of the second residual network from a second hyperparameter value subset. A plurality of hyperparameters of the second residual network includes the second hyperparameter, and the hyperparameter value set includes the first hyperparameter value subset and the second hyperparameter value subset.

In some embodiments of this application, the structural layer includes a plurality of first residual networks and a plurality of second residual networks, the hyperparameter value set includes a plurality of first hyperparameter value subsets and a plurality of second hyperparameter value subsets, the plurality of first residual networks are in a one-to-one correspondence with the plurality of first hyperparameter value subsets, and the plurality of second residual networks are in a one-to-one correspondence with the plurality of second hyperparameter value subsets.

The first determining unit is configured to determine a first hyperparameter value corresponding to a first hyperparameter of a target first residual network from each first hyperparameter value subset in the plurality of first hyperparameter value subsets, the target first residual network being a first residual network corresponding to the each first hyperparameter value subset.

The second determining unit is configured to determine a second hyperparameter value corresponding to a second hyperparameter of a target second residual network from each second hyperparameter value subset in the plurality of second hyperparameter value subsets, the target second residual network being a second residual network corresponding to the each second hyperparameter value subset.

In some embodiments of this application, the update module includes at least a first update unit configured to update first hyperparameter values corresponding to first hyperparameters of some first residual networks to third hyperparameter values corresponding to the some first residual networks. The third hyperparameter values being hyperparameter values in the first hyperparameter value subset. The update module may also include a second update unit configured to update second hyperparameter values corresponding to second hyperparameters of some second residual networks to fourth hyperparameter values corresponding to the some second residual networks. The fourth hyperparameter values are hyperparameter values in the second hyperparameter value subset.

In some embodiments of this application, the structural layer includes the first residual network and the second residual network. The first hyperparameter includes a convolution kernel size of a first convolution kernel in convolution kernels included in the first residual network, and the second hyperparameter includes a quantity of the concatenated second residual networks. The determining module includes a third determining unit configured to determine the convolution kernel size of the first convolution kernel in the first residual network from a third hyperparameter value subset as a target convolution kernel size value, and a fourth determining unit configured to determine the quantity of the concatenated second residual networks from a fourth hyperparameter value subset as a target quantity. The hyperparameter value set includes the third hyperparameter value subset and the fourth hyperparameter value subset.

In some embodiments of this application, the obtaining module includes a training unit, configured to train the first neural network model by using a first training sample set obtained from a target application, to obtain the second neural network model, and a detection unit, configured to detect, by using the second neural network model, each verification sample in a verification sample set obtained from the target application, to obtain a detection result corresponding to the each verification sample in the verification sample set. The verification sample set includes a plurality of verification samples obtained from the target application and a target detection result corresponding to the each verification sample. The obtaining module also includes a fifth determining unit, configured to determine a proportion of a quantity of matches in a total quantity of the plurality of verification samples as the first model accuracy, the quantity of matches being used for indicating a quantity of verification samples of which detection results corresponding to the verification samples match target detection results corresponding to the verification samples.

In some embodiments of this application, the apparatus further includes a training module configured to train, after the hyperparameter values of the some hyperparameters in the first neural network model are updated to the corresponding target hyperparameter values in the hyperparameter value set to obtain the third neural network model, the third neural network model by using a second training sample set obtained from a target application, to obtain the fourth neural network model. The apparatus also includes a detection module, configured to detect to-be-detected data in the target application by using the fourth neural network model.

In some embodiments of this application, the second training sample set includes scene data and operation data corresponding to the scene data. Correspondingly, the training module includes an initialization unit configured to initialize a loss function including an input layer, an output layer, a structural layer, and a third neural network model parameter, and an input unit configured to input the scene data in the second training sample set into the third neural network model in each iterative training process of the third neural network model, to obtain predicted operation data. The training module also includes a loss function minimization unit configured to substitute operation data selected from the training sample set and the predicted operation data into the loss function, to solve a corresponding third neural network model parameter in a case that a minimum value of the loss function is obtained, and an update unit configured to update the third neural network model according to the solved third neural network model parameter, to obtain the fourth neural network model.

In some embodiments of this application, the input layer includes a convolutional layer, a batch normalization layer, and an activation layer, the output layer includes a fully-connected layer and a loss function layer, and the structural layer includes four layers of first residual networks and four layers of second residual networks. The first neural network model is a neural network model obtained by connecting an input layer, a structural layer having the hyperparameter value, and an output layer in a target connection manner, the target connection manner including concatenating the convolutional layer, the batch normalization layer, and the activation layer, to obtain the input layer, and concatenating the fully-connected layer and the loss function layer to obtain the output layer. Also included is concatenating the first layer of first residual network, the first layer of second residual network, the second layer of first residual network, the second layer of second residual network, the third layer of first residual network, the third layer of second residual network, the fourth layer of first residual network, and the fourth layer of second residual network to obtain the structural layer. The hyperparameter value of the structural layer includes a convolution kernel size of each layer of first residual network in the four layers of first residual networks, and a quantity of the concatenated second residual networks in each layer of the four layers of second residual networks. Then the input layer, the structural layer having the hyperparameter value, and the output layer in a concatenation manner are concatenated to obtain the first neural network model.

For the application environment in this embodiment of this application, refer to, but not limited to, the application environment in the foregoing embodiment. This embodiment of this application provides an application example for implementing the method for generating a neural network model.

Deep learning is widely applied to the field of game AI. In addition to the well-known deep reinforcement learning, imitation learning is also widely applied to the field of game AI. In an action cloning manner of imitation learning, recorded game action strategies of a human expert are learned of, and a model of machine learning then matches a currently encountered situation with saved actions of the expert, and deals with the situation by imitating an action made by the expert.

In the related art, for each game, developers are required to design a neural network architecture of a specific game. The method for generating a neural network model may be applied to, but not limited to be, generating a neural network model applicable to a scenario of imitation learning of a target game application. In this scenario, the method for generating a neural network model is provided for a specific game, to achieve automatic exploration of a neural network architecture by combining a heuristic algorithm and a Bayesian optimization algorithm. Developers may be substituted with concurrent computing resources, to achieve rapid exploration of different neural network architectures, and find an optimized architecture suitable for a specific game. Through the exploration of the neural network architecture, different neural network architectures of imitation learning may be used for different games such as an automobile racing game and a first-person shooting game to obtain better action effects.

Figure 10:
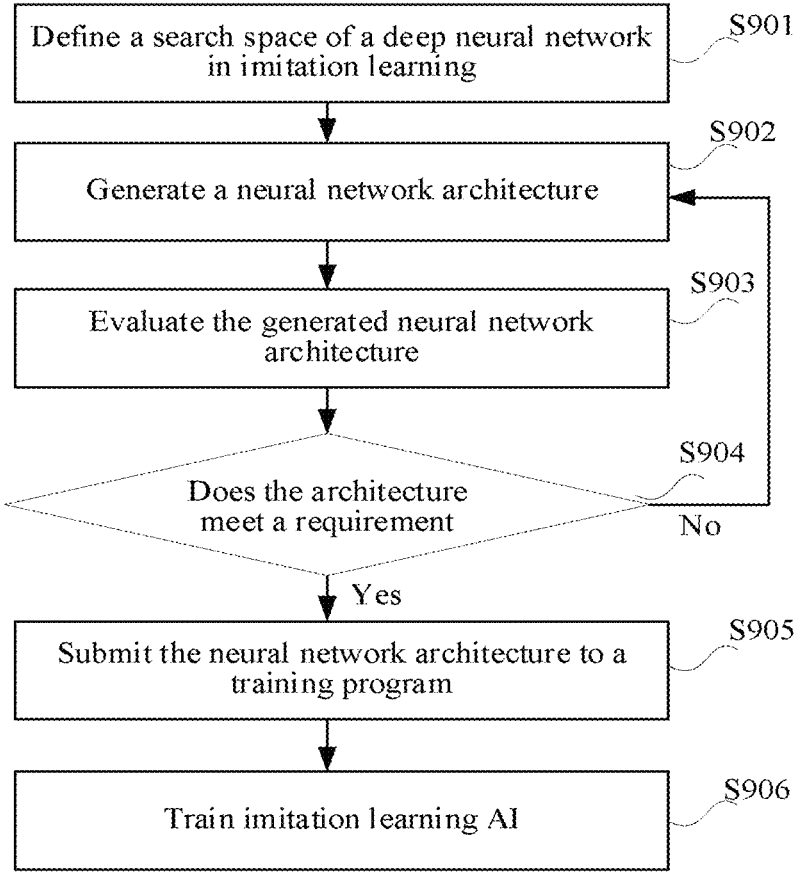
FIG. 10 is a schematic flowchart of implementation of a method for generating a neural network model according to an embodiment of this application.

As shown in FIG. 10, the foregoing process of generating a neural network model includes the following steps.

In step S901, a search space of a deep neural network used in imitation learning is determined.

The search space of the neural network defines what type of a neural network can be found through searching, and also defines how to describe a neural network architecture. A calculation implemented by the neural network may be abstracted into a directed acyclic graph (DAG) without an isolated node. Nodes in the graph represent layers of the neural network, and edges represent flowing of data. Each node receives data from a predecessor node (with an incoming edge), and outputs the data to a successor node (with an outgoing edge) after the calculation. Theoretically, any DAG without an isolated node is a legitimate neural network architecture.

From a simple graph structure to any DAG also reflects development of the entire neural network architecture. The simplest neural network is a linear chain structure, and each node in a graph corresponding to the neural network has at most one predecessor node and one successor node, which is similar to a linked list in a data structure. Early fully-connected neural networks and convolutional neural networks are all in such a topology. Nodes in Inception, ResNet, and DenseNet are allowed to have a plurality of predecessor nodes and a plurality of successor nodes to form a multi-branch, cross-layer connected structure, including more complex graphs. In a neural network architecture, except for that the first layer needs to be an input layer, and the last layer needs to be an output layer, types of intermediate layers are optional and represent types of different operations, that is, layers. Typical examples are a fully-connected layer, a convolutional layer, a deconvolutional layer, an atrous convolution layer, a pooling layer, an activation function layer, and the like.

In step S902, a Bayesian optimization algorithm is executed in the search space of the neural network architecture to obtain a neural network architecture.

A neural network is explored completely from 0 based on the search space of the neural network architecture, the search space is very huge, and a huge amount of hardware resources need to be consumed for finding a neural network architecture suitable for a specific game. Although this method saves investment of manpower, this method consumes a huge amount of hardware resources and is also very time-consuming. Therefore, in this embodiment of this application, the ResNet50 is used as a basis of the neural network architecture, and then, a neural network architecture suitable for each game is explored by using the Bayesian optimization algorithm on the basis.

In step S903, verification is performed on the neural network architecture generated in step S902, to obtain an evaluation value of an accuracy of the network.

In step S904, whether an evaluation result of the network meets a requirement is checked, and steps S902 to S904 are performed if the result does not meet the requirement.

In step S905, after a neural network architecture that meets the requirement is obtained, the neural network architecture is transmitted to a training program of imitation learning.

In step S906, the training program of imitation learning performs training by using the neural network architecture, to obtain an AI model of a specific game.

In this embodiment of this application, a neural network architecture that meets a requirement of a specific game is found through searching in the foregoing process is shown in FIG. 11. A difference between the network architecture and the original ResNet50 lies in that quantities of repetitions of the block B in Layer5, Layer7, and Layer9 are reduced to some extent, leading to advantages that a size of a network weight file can be reduced, and costs of computing resources are lowered. In addition, a convolution kernel size of Layer2 is also different from an original one (not shown in the figure). A convolution kernel of Layer2 is changed from original 1×1×64×64 to 1×1×64×32, from which it can be seen that the convolution kernel size is also reduced by half, which can also improve computational efficiency.

Through the foregoing process, different imitation learning networks can be generated for different game requirements, and the neural network architecture is designed by using an automatic neural network architecture search algorithm. In this way, AI users of imitation learning can obtain a relatively good neural network model without profound understanding of details of a deep learning model. In addition, a plurality of servers may be used for concurrently exploring a neural network architecture, which allows, compared with manual exploration, different neural network architectures to be explored more quickly for finding an optimized network architecture for a specific game. On the other hand, by using the Bayesian optimization algorithm, a set of better neural network architectures may be generated with the help of prior information of neural network architectures that have been explored, which is more efficient than random search and grid search. The ResNet50 is used as the basis of the neural network architecture search and is abstracted into different modules (blocks), and combinations of and inputs between different blocks are explored by using an algorithm, thereby reducing a search space and greatly improving the search efficiency.

Figure 12:
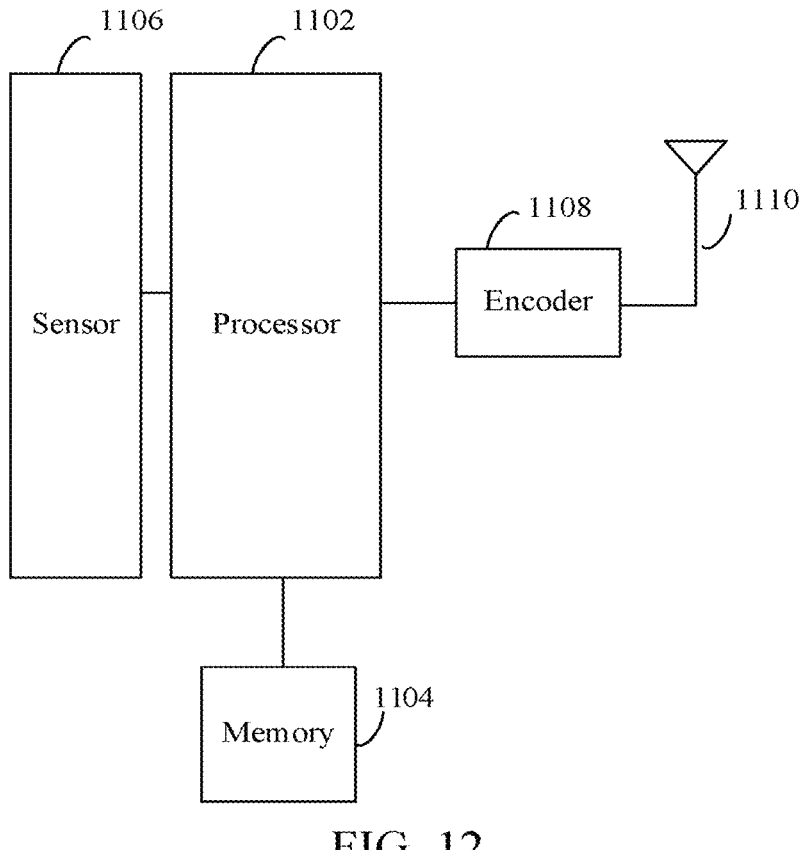
FIG. 12 is a schematic diagram of an electronic device according to an embodiment of this application.

According to still another aspect of the embodiments of this application, an electronic device configured to implement the foregoing method for generating a neural network model is further provided. As shown in FIG. 12, the electronic device includes one or more (only one is shown in the figure) processors (processing circuitry) 1102, a memory (memory circuit 1104, a sensor 1106, an encoder 1108, and a transmission apparatus 1110, the memory storing a computer program, and the processor being configured to perform the steps in any one of the foregoing method embodiments by using the computer program.

In this embodiment of this application, the electronic device may be located in at least one of a plurality of network devices in a computer network.

In this embodiment of this application, the processor may be configured to perform the following steps by using the computer program:

In S1, a hyperparameter value corresponding to a hyperparameter in a first neural network model is determined from a hyperparameter value set, the first neural network model being a neural network model obtained by connecting an input layer, a structural layer having the hyperparameter value, and an output layer in a target connection manner.

In S2, a first model accuracy of a second neural network model obtained by training the first neural network model is obtained. The first model accuracy is used for indicating an accuracy of detecting a verification sample set by using the second neural network model.

In S3, hyperparameter values of some hyperparameters in the first neural network model are updated to corresponding target hyperparameter values in the hyperparameter value set in a case that the first model accuracy is lower than a target accuracy, to obtain a third neural network model, the second model accuracy of detecting the verification sample set by using a fourth neural network model obtained by training the third neural network model being higher than or equal to the target accuracy.

A person of ordinary skill in the art may understand that, the structure shown in FIG. 12 is only schematic. The electronic device may be a terminal device such as a smartphone (such as an Android mobile phone or an iOS mobile phone), a tablet computer, a palmtop computer, a mobile Internet device (MID), or a PAD. FIG. 12 does not constitute a limitation on the structure of the electronic device. For example, the electronic device may alternatively include more or fewer components (such as a network interface and a display device) than those shown in FIG. 12, or has a configuration different from that shown in FIG. 12.

The memory 1104 may be configured to store a software program and a module, for example, a program instruction/module corresponding to the method for generating a neural network model in the embodiments of this application. The processor 1102 runs the software program and the module stored in the memory 1104, to perform various functional applications and data processing, that is, implement the foregoing method for generating a neural network model. The memory 1104 may include a high-speed random memory, and may also include a non-volatile memory, for example, one or more magnetic storage apparatuses, a flash memory, or another nonvolatile solid-state memory. In some embodiments, the memory 1104 may further include memories remotely disposed relative to the processor 1102, and the remote memories may be connected to the terminal through a network. Examples of the network include, but are not limited to, the Internet, an intranet, a local area network, a mobile communication network, and a combination thereof.

The above transmission apparatus 1110 is configured to receive or transmit data through a network. Examples of the foregoing network may include a wired network and a wireless network. In an example, the transmission apparatus 1110 includes a network interface controller (NIC). The NIC may be connected to another network device and a router by using a network cable, so as to communicate with the Internet or a local area network. In an example, the transmission apparatus 1110 is a radio frequency (RF) module that is configured to communicate with the Internet in a wireless manner.

The memory 1104 is configured to store an application program.

An embodiment of this application further provides a storage medium, storing a computer program, the computer program being used for performing steps in any one of the foregoing method embodiments when being run.

In this embodiment of this application, the storage medium may be configured to store a computer program, configured to perform the following steps:

In S1, a hyperparameter value corresponding to a hyperparameter in a first neural network model is determined from a hyperparameter value set, the first neural network model being a neural network model obtained by connecting at least an input layer, a structural layer having the hyperparameter value, and an output layer in a target connection manner.

In S2, a first model accuracy of a second neural network model obtained by training the first neural network model is obtained. The first model accuracy is used for indicating an accuracy of detecting a verification sample set by using the second neural network model.

In S3, hyperparameter values of some hyperparameters in the first neural network model are updated to corresponding target hyperparameter values in the hyperparameter value set in a case that the first model accuracy is lower than a target accuracy, to obtain a third neural network model. The second model accuracy of detecting the verification sample set by using a fourth neural network model is higher than or equal to the target accuracy, and the fourth neural network model is obtained by training the third neural network model.

In some embodiments of this application, the storage medium is further configured to store a computer program configured to perform the steps included in the methods according to the foregoing embodiments.

In this embodiment of this application, a person of ordinary skill in the art may understand that all or some of the steps of the methods in the foregoing embodiments may be implemented by a program instructing relevant hardware of the terminal device. The program may be stored in a non-transitory computer-readable storage medium, and the non-transitory computer-readable storage medium may include a flash disk, a read-only memory (ROM), a random access memory (RAM), a magnetic disk, an optical disc, or the like.

The sequence numbers of the foregoing embodiments of this application are merely for description purpose, and are not intended to indicate priorities of the embodiments.

When the integrated unit in the foregoing embodiments is implemented in the form of a software functional unit and sold or used as an independent product, the integrated unit may be stored in the foregoing computer-readable storage medium. Based on such an understanding, the technical solutions of the embodiments of this application essentially, or the part contributing to the related art, or all or some of the technical solutions may be implemented in the form of a software product. The computer software product is stored in a storage medium and includes several instructions for instructing one or more computer devices (which may be a personal computer, a server, a network device, or the like) to perform all or some of the steps of the methods described in the embodiments of this application.

In the foregoing embodiments of this application, the descriptions of the embodiments have respective focuses. For a part that is not described in detail in an embodiment, reference may be made to related descriptions in other embodiments.

In the several embodiments provided in this application, it is to be understood that, the disclosed client may be implemented in another manner. The apparatus embodiments described above are merely exemplary. For example, the division of the units is merely the division of logic functions, and may use other division manners during actual implementation. For example, a plurality of units or components may be combined, or may be integrated into another system, or some features may be omitted or not performed. In addition, the coupling, or direct coupling, or communication connection between the displayed or discussed components may be the indirect coupling or communication connection through some interfaces, units, or modules, and may be in electrical or other forms.

The units described as separate parts may or may not be physically separate. Parts displayed as units may or may not be physical units, and may be located at one position, or may be distributed on a plurality of network units. Some or all of the units may be selected according to actual needs to achieve the objectives of the solutions of the embodiments of this application.

In addition, functional units in the embodiments of this application may be integrated into one processing unit, or each of the units may be physically separated, or two or more units may be integrated into one unit. The integrated unit may be implemented in the form of hardware, or may be implemented in the form of a software functional unit.

The foregoing descriptions are exemplary implementations of this application. A person of ordinary skill in the art may make several improvements and refinements without departing from the principle of this application, and the improvements and refinements shall fall within the protection scope of this application.

Industrial Practicability

In the embodiments of this application, a hyperparameter value corresponding to a hyperparameter in a first neural network model is determined from a hyperparameter value set, a first model accuracy of a second neural network model obtained by training the first neural network model is obtained, and hyperparameter values of some hyperparameters in the first neural network model are updated to corresponding target hyperparameter values in the hyperparameter value set in a case that the first model accuracy is lower than a target accuracy, to obtain a third neural network model, thereby improving the efficiency of generating a neural network model and further resolving the technical problem of relatively low efficiency of generating a neural network model.

What is claimed is:

1. A method for an electronic device to generate a neural network model configured to control a non-player game element in a game, comprising:

determining, with processing circuitry of the electronic device, hyperparameter values for a first neural network model from a hyperparameter value set, the first neural network model comprising an input layer, a structural layer, and an output layer, the input layer connected in a target connection, the structural layer including a plurality of first structural blocks and a plurality of second structural blocks, the hyperparameter value set including a plurality of first hyperparameter value subsets and a plurality of second hyperparameter value subsets, the plurality of first structural blocks are in a one-to-one correspondence with the plurality of first hyperparameter value subsets, and the plurality of second structural blocks are in a one-to-one correspondence with the plurality of second hyperparameter value subsets, wherein a first hyperparameter value corresponding to a first hyperparameter, for each of the plurality of first structural blocks, is determined from the corresponding first hyperparameter value subset, and a second hyperparameter value corresponding to a second hyperparameter, for each of the plurality of second structural blocks, is determined from the corresponding second hyperparameter value subset;

obtaining a first model accuracy of a second neural network model by training the first neural network model;

in a case that the first model accuracy is lower than a target accuracy, updating, by the processing circuitry of the electronic device, hyperparameter values of some hyperparameters in the first neural network model to values from the hyperparameter value set to obtain a third neural network model;

obtaining a second model accuracy of a fourth neural network model by training the third neural network model using a verification sample set from a target application; and determining, based on the fourth neural network model and the second model accuracy being greater than or equal to the target accuracy, operation data that indicates one or more actions to be performed by the non-player game element in the game based on game data from the game.

2. The method according to claim 1, wherein the updating the hyperparameter values comprises at least one of:

updating first hyperparameter values corresponding to first hyperparameters of some of the first structural blocks to corresponding third hyperparameter values, the third hyperparameter values being the hyperparameter values in the first hyperparameter value subset; and updating second hyperparameter values corresponding to second hyperparameters of some of the second structural blocks to corresponding fourth hyperparameter values, the fourth hyperparameter values being the hyperparameter values in the second hyperparameter value subset.

3. The method according to claim 1, wherein the first hyperparameter comprises a convolution kernel size of a first convolution kernel in convolution kernels comprised in the first structural block, the second hyperparameter comprises a quantity of concatenated second structural blocks, and the determining the hyperparameter values comprises:

determining the convolution kernel size of the first convolution kernel in the first structural block from a third hyperparameter value subset as a target convolution kernel size value; and determining the quantity of the concatenated second structural blocks from a fourth hyperparameter value subset as a target quantity, the hyperparameter value set comprising the third hyperparameter value subset and the fourth hyperparameter value subset.

4. The method according to claim 1, wherein the obtaining the first model accuracy comprises:

training the first neural network model by using a first training sample set obtained from the target application, to obtain the second neural network model;

detecting, by using the second neural network model, each verification sample in the verification sample set obtained from the target application, to obtain a detection result corresponding to each verification sample in the verification sample set, the verification sample set comprising a plurality of verification samples obtained from the target application and a target detection result corresponding to each verification sample; and determining a proportion of a quantity of matches in a total quantity of the plurality of verification samples as the first model accuracy, the quantity of the matches indicating a quantity of verification samples of which detection results corresponding to the verification samples match target detection results corresponding to the verification samples.

5. The method according to claim 1, wherein the method further comprises:

training the third neural network model by using a second training sample set obtained from the target application, to obtain the fourth neural network model.

6. The method according to claim 5, wherein the second training sample set comprises scene data and operation data corresponding to the scene data, and the training the third neural network model comprises:

initializing a loss function comprising an input layer, an output layer, a structural layer, and a third neural network model parameter;

inputting the scene data in the second training sample set into the third neural network model in each iterative training process of the third neural network model, to obtain predicted operation data;

substituting the operation data corresponding to the scene data and selected from the second training sample set and the predicted operation data into the loss function, to solve a corresponding third neural network model parameter in a case that a minimum value of the loss function is obtained; and updating the third neural network model according to the third neural network model parameter that is solved, to obtain the fourth neural network model.

7. The method according to claim 1, wherein the input layer comprises a convolutional layer, a batch normalization layer, and an activation layer, the output layer comprises a fully-connected layer and a loss function layer, and the structural layer comprises four layers of first structural blocks and four layers of second structural blocks.

8. The method according to claim 7, wherein the first neural network model is obtained by connecting the input layer, the structural layer having the hyperparameter value, and the output layer in the target connection, and the target connection comprises:

concatenating the convolutional layer, the batch normalization layer, and the activation layer, to obtain the input layer;

concatenating the fully-connected layer and the loss function layer to obtain the output layer;

concatenating a first layer of the first structural blocks, a first layer of the second structural blocks, a second layer of the first structural blocks, a second layer of the second structural blocks, a third layer of the first structural blocks, a third layer of the second structural blocks, a fourth layer of the first structural blocks, and a fourth layer of the second structural blocks to obtain the structural layer, the hyperparameter value of the structural layer comprising: a convolution kernel size of each layer of first structural block in the four layers of the first structural blocks, and a quantity of concatenated second structural blocks in each layer of the four layers of the second structural blocks; and connecting the input layer, the structural layer having the hyperparameter value, and the output layer in a concatenation manner, to obtain the first neural network model.

9. An apparatus, comprising:

processing circuitry configured to:

determine hyperparameter values for a first neural network model from a hyperparameter value set, the first neural network model comprising an input layer, a structural layer, and an output layer connected in a target connection, the structural layer including a plurality of first structural blocks and a plurality of second structural blocks, the hyperparameter value set including a plurality of first hyperparameter value subsets and a plurality of second hyperparameter value subsets, the plurality of first structural blocks are in a one-to-one correspondence with the plurality of first hyperparameter value subsets, and the plurality of second structural blocks are in a one-to-one correspondence with the plurality of second hyperparameter value subsets, wherein a first hyperparameter value corresponding to a first hyperparameter, for each of the plurality of first structural blocks, is determined from the corresponding first hyperparameter value subset, and a second hyperparameter value corresponding to a second hyperparameter, for each of the plurality of second structural blocks, is determined from the corresponding second hyperparameter value subset;

obtain a first model accuracy of a second neural network model by training the first neural network model;

in a case that the first model accuracy is lower than a target accuracy, update hyperparameter values of some hyperparameters in the first neural network model to values from the hyperparameter value set to obtain a third neural network model;

obtain a second model accuracy of a fourth neural network model by training the third neural network model using a verification sample set from a target application; and determine, based on the fourth neural network model and the second model accuracy being greater than or equal to the target accuracy, operation data that indicates one or more actions to be performed by a non-player game element in a game based on game data from the game.

10. The apparatus according to claim 9, wherein the structural layer comprises the first structural block and the second structural block, the first hyperparameter comprises a convolution kernel size of a first convolution kernel in convolution kernels comprised in the first structural block, the second hyperparameter comprises a quantity of concatenated second structural blocks.

11. The apparatus according to claim 10, wherein the processing circuitry is further configured to:

determine the convolution kernel size of the first convolution kernel in the first structural block from a third hyperparameter value subset as a target convolution kernel size value; and determine the quantity of the concatenated second structural blocks from a fourth hyperparameter value subset as a target quantity, the hyperparameter value set comprising the third hyperparameter value subset and the fourth hyperparameter value subset.

12. The apparatus according to claim 9, wherein the processing circuitry is further configured to:

train the third neural network model by using a second training sample set obtained from the target application, to obtain the fourth neural network model.

13. A non-transitory computer-readable medium storing instructions which when executed by at least one processor cause the at least one processor to perform:

determining hyperparameter values for a first neural network model from a hyperparameter value set, the first neural network model comprising an input layer, a structural layer, and an output layer connected in a target connection, the structural layer including a plurality of first structural blocks and a plurality of second structural blocks, the hyperparameter value set including a plurality of first hyperparameter value subsets and a plurality of second hyperparameter value subsets, the plurality of first structural blocks are in a one-to-one correspondence with the plurality of first hyperparameter value subsets, and the plurality of second structural blocks are in a one-to-one correspondence with the plurality of second hyperparameter value subsets, wherein a first hyperparameter value corresponding to a first hyperparameter, for each of the plurality of first structural blocks, is determined from the corresponding first hyperparameter value subset, and a second hyperparameter value corresponding to a second hyperparameter, for each of the plurality of second structural blocks, is determined from the corresponding second hyperparameter value subset;

obtaining a first model accuracy of a second neural network model by training the first neural network model;

in a case that the first model accuracy is lower than a target accuracy, updating hyperparameter values of some hyperparameters in the first neural network model to values from the hyperparameter value set to obtain a third neural network model;

obtaining a second model accuracy of a fourth neural network model by training the third neural network model using a verification sample set from a target application; and determining, based on the fourth neural network model and the second model accuracy being greater than or equal to the target accuracy, operation data that indicates one or more actions to be performed by a non-player game element in a game based on game data from the game.

14. The non-transitory computer-readable medium according to claim 13, wherein the instructions further cause the at least one processor to perform:

training the third neural network model by using a second training sample set obtained from the target application, to obtain the fourth neural network model.

\* \* \* \* \*